United States Patent
Kowalchuk et al.

(10) Patent No.: US 12,207,589 B2
(45) Date of Patent: Jan. 28, 2025

(54) SEEDER ROW UNIT HAVING A CLOSING SYSTEM

(71) Applicant: CNH Industrial Canada, Ltd., Saskatoon (CA)

(72) Inventors: Trevor Lawrence Kowalchuk, Saskatoon (CA); Dennis George Thompson, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 835 days.

(21) Appl. No.: 17/360,191

(22) Filed: Jun. 28, 2021

(65) Prior Publication Data

US 2022/0000014 A1  Jan. 6, 2022

Related U.S. Application Data (60) Provisional application No. 63/046,967, filed on Jul. 1, 2020.

(51) Int. Cl.
*A01C 7/20* (2006.01)
*A01C 5/06* (2006.01)

(52) U.S. Cl.
CPC .............. *A01C 7/203* (2013.01); *A01C 5/068* (2013.01); *A01C 7/208* (2013.01)

(58) Field of Classification Search
CPC ......... A01C 7/203; A01C 5/068; A01C 7/208; A01C 7/201; A01C 7/20; A01C 7/00; A01C 5/066; A01C 5/06; A01C 5/00
See application file for complete search history.

(56) References Cited

U.S. PATENT DOCUMENTS

| | | |
|---|---|---|
| 4,191,262 A | 3/1980 | Sylvester |
| 5,497,717 A | 3/1996 | Martin |
| 5,685,246 A | 11/1997 | Zimmerman |
| 6,144,910 A | 11/2000 | Scarlett et al. |
| 6,216,616 B1 | 4/2001 | Bourgault |
| 6,345,671 B1 | 2/2002 | Siemens et al. |
| 6,530,334 B2 | 3/2003 | Hagny |
| 6,701,857 B1 | 3/2004 | Jensen et al. |
| 7,191,715 B2 | 3/2007 | Wendte et al. |
| 7,581,503 B2 | 9/2009 | Martin et al. |

(Continued)

FOREIGN PATENT DOCUMENTS

| | | |
|---|---|---|
| WO | WO2017087284 | 5/2017 |
| WO | WO2017112446 | 6/2017 |
| WO | WO2018075788 | 4/2018 |

OTHER PUBLICATIONS

Eckelkamp, "Closing in on the Seed", Agweb, Feb. 7, 2011, https://www.agweb.com/news/crops/crop-production-news/crops/farm-journal-test-plots/closing-seed.

(Continued)

*Primary Examiner* — Christopher J. Novosad
(74) *Attorney, Agent, or Firm* — Rebecca Henkel; Peter K. Zacharias; Rickard K. DeMIlle (57) ABSTRACT

A row unit of a seeder includes an opener having a shank and a blade rigidly coupled to the shank. The shank is configured to be movably coupled to a toolbar of the seeder. The row unit also includes a closing system having a frame coupled to the opener. The frame is only coupled to the toolbar via the opener. In addition, the closing system includes a closing disc arm pivotally coupled to the frame and at least one closing disc rotatably coupled to the closing disc arm. The closing system also includes a packer wheel arm coupled to the frame and a packer wheel rotatably coupled to the packer wheel arm.

16 Claims, 4 Drawing Sheets

(56) References Cited

U.S. PATENT DOCUMENTS

| | | | |
|---|---|---|---|
| 7,866,269 | B2 | 1/2011 | Naylor et al. |
| 7,938,074 | B2 | 5/2011 | Liu |
| 7,980,186 | B2 | 7/2011 | Henry |
| 8,103,417 | B2 | 1/2012 | Gharsalli et al. |
| 8,267,021 | B2 | 9/2012 | Mariman et al. |
| 8,275,525 | B2 | 9/2012 | Kowalchuk et al. |
| 8,342,258 | B2 | 1/2013 | Ryder et al. |
| 8,356,564 | B2 | 1/2013 | Breker et al. |
| 8,522,889 | B2 | 9/2013 | Adams et al. |
| 8,910,582 | B2 | 12/2014 | Mariman et al. |
| 9,148,989 | B2 | 10/2015 | Van Buskirk et al. |
| 9,179,593 | B2 | 11/2015 | Anderson et al. |
| 9,357,692 | B2 | 6/2016 | Johnson et al. |
| 9,497,900 | B2 | 11/2016 | Nelson et al. |
| 9,582,002 | B2 | 2/2017 | Cavender-Bares |
| 9,706,703 | B2 | 7/2017 | Anderson et al. |
| 9,814,172 | B2 | 11/2017 | Achen et al. |
| 9,848,523 | B2 | 12/2017 | Sauder et al. |
| 9,872,425 | B2 | 1/2018 | Anderson et al. |
| 9,930,826 | B2 | 4/2018 | McCloskey |
| 9,943,030 | B2 | 4/2018 | Sheppard |
| 10,006,994 | B2 | 6/2018 | Chan et al. |
| 10,060,467 | B2 | 8/2018 | Schaffert et al. |
| 10,143,128 | B2 | 12/2018 | Landphair et al. |
| 10,149,424 | B2 | 12/2018 | Maust et al. |
| 10,178,823 | B2 | 1/2019 | Kovach et al. |
| 10,231,376 | B1 | 3/2019 | Stanhope et al. |
| 10,257,974 | B1 | 4/2019 | Schoeny et al. |
| 10,299,424 | B2 | 5/2019 | Hamilton |
| 10,308,116 | B2 | 6/2019 | Czapka et al. |
| 2016/0100517 | A1 | 4/2016 | Bassett |
| 2017/0359940 | A1 | 12/2017 | Bassett |
| 2018/0317376 | A1 | 11/2018 | Gebbeken et al. |
| 2019/0033895 | A1 | 1/2019 | Thompson et al. |
| 2019/0124824 | A1 | 5/2019 | Hubner et al. |
| 2022/0000010 | A1 | 1/2022 | Kowalchuk et al. |
| 2022/0000015 | A1 | 1/2022 | Kowalchuk et al. |

OTHER PUBLICATIONS

Taylor, "Case Planter Gives Seed a Head Start", The Weekly Times, Nov. 28, 2018, 2 pgs, News Limited, Melbourne, Vic., http://dialog.proquest.com/professional/docview/2138085294?accountid=157282.

"Seed Hawk Gives Big Working Opportunities with Narrow Transport Widths", Southern Weekly, Feb. 2, 2014, 2 pgs, Fairfax Media Publications Pty Limited, Australia, http://dialog.proquest.com/professional/docview/1493849510?accountid=157282.

Concord Seeding Equipment Full Line 2020, Concord, Jun. 2019, https://concordseeding.com/media/1536/concord_full-line_brochure_060519-1_web.pdf.

Nutri-Placer 930 & 940, Pull-Type NH3 Applicators, Case IH Agriculture, 2018, 16 pgs.

Screen capture from YouTube video clip entitled "ProSeries™ Opener Animation Video | John Deere Air Seeding Equipment", uploaded on Aug. 23, 2018 by John Deere. Retrieved from Internet: https://youtu.be/CFINEeZe77I.

Amity Seeding Equipment, Oct. 2017, 24 pgs.

Amity Technology, Single Disc Drill, Aug. 2016, 7 pgs.

Concord, Air Seeders, Precision Shank Drill, Jul. 2019, 2 pgs.

Screen capture from YouTube video clip entitled "How To Adjust The Depth Setting On Seed Hawk Openers", uploaded on Mar. 18, 2016 by Vaderstad Canada. Retrieved from Internet: https://www.youtube.com/watch?v=qEZhHL70IDs.

Screen capture from YouTube video clip entitled "SeedMaster 2013", uploaded on Aug. 16, 2013 by SeedMaster. Retrieved from Internet: https://www.youtube.com/watch?v=gi6z3KoEDjo.

Screen capture from YouTube video clip entitled "TruSet on the John Deere P500", uploaded on Aug. 24, 2016 by John Deere. Retrieved from Internet: https://www.youtube.com/watch?v=CaLw37jtIKE.

Screen capture from YouTube video clip entitled "Get to Know the Yetter 10,000 Mangnum™ M Opener for Fertilizer Application", uploaded on Aug. 8, 2017 by Yetter Farm Equipment. Retrieved from Internet: https://www.youtube.com/watch?v=0Wqo3kx5Kgk.

Screen capture from YouTube video clip entitled "RCX Hydraulic Closing System", uploaded on Jun. 28, 2019 by Dawn Equipment. Retrieved from Internet: https://www.youtube.com/watch?v=oNrFWQWWRas.

Screen capture from YouTube video clip entitled "Precision Planting FurrowForce", uploaded on Jan. 29, 2019 by Future Farming. Retrieved from Internet: https://www.youtube.com/watch?v=r4REyHYwffU.

Screen capture from YouTube video clip entitled "Case IH Precision Disk 500T Disk Drill Animation", uploaded on Jun. 9, 2014 by Case IH North America. Retrieved from Internet: https://www.youtube.com/watch?v=-_4k3RGoY50.

Screen capture from YouTube video clip entitled "Introducing the 2000 Series Early Riser Planter", uploaded on Nov. 23, 2015 by Case IH North America. Retrieved from Internet: https://www.youtube.com/watch?v=u8LBWKnkl-s.

SEEDER ROW UNIT HAVING A CLOSING SYSTEM

CROSS-REFERENCE TO RELATED APPLICATION

This application claims priority from and the benefit of U.S. Provisional Application Ser. No. 63/046,967, entitled "Seeder Row Unit Having a Closing System", filed Jul. 1, 2020, which is hereby incorporated by reference in its entirety.

BACKGROUND

The present disclosure relates generally to a seeder row unit having a closing system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., positioned adjacent to the opener) is configured to deposit seeds into the trench. The opener/seed tube may be followed by a packer wheel that packs the soil on top of the deposited seeds. Unfortunately, while the row unit is operating within a field having certain soil types and/or certain soil conditions, the packer wheel may not effectively close the trench and/or break up the side walls of the trench. Accordingly, the resultant yield performance from the deposited seeds may be reduced.

BRIEF DESCRIPTION

In certain embodiments, a row unit of a seeder includes an opener having a shank and a blade rigidly coupled to the shank. The shank is configured to be movably coupled to a toolbar of the seeder. The row unit also includes a closing system having a frame coupled to the opener. The frame is only coupled to the toolbar via the opener. In addition, the closing system includes a closing disc arm pivotally coupled to the frame and at least one closing disc rotatably coupled to the closing disc arm. The closing disc arm positions a rotational axis of the at least one closing disc rearward of the blade of the opener relative to a direction of travel of the row unit. The closing system also includes a packer wheel arm coupled to the frame and a packer wheel rotatably coupled to the packer wheel arm. The packer wheel arm positions a rotational axis of the packer wheel rearward of the rotational axis of the at least one closing disc relative to the direction of travel of the row unit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
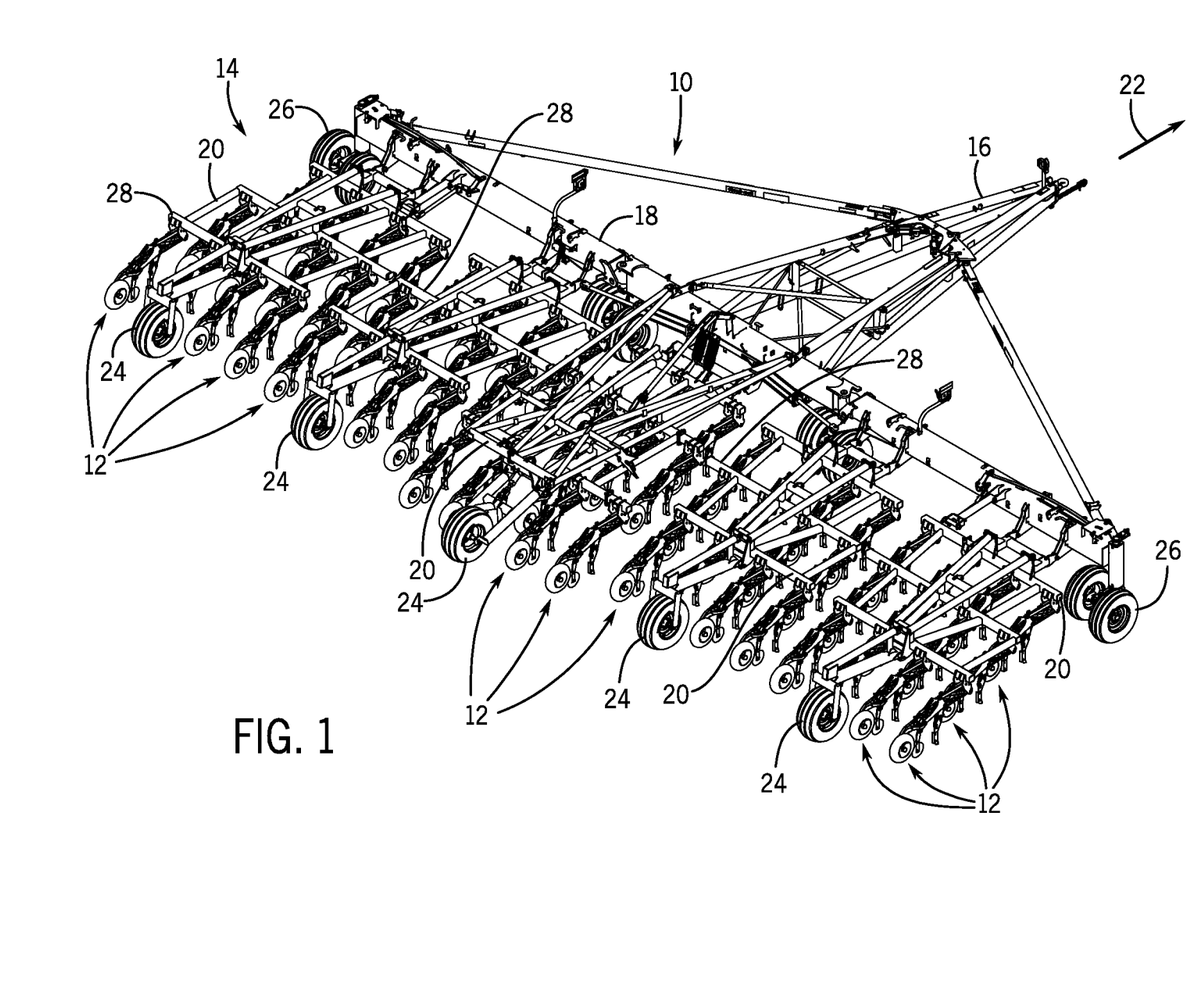
FIG. 1 is a perspective view of an embodiment of an agricultural seeding implement having multiple row units.

FIG. 1 is a perspective view of an embodiment of an agricultural seeding implement 10 (e.g., seeder) having multiple row units 12. In the illustrated embodiment, the agricultural seeding implement includes a frame 14 having a hitch assembly 16, a main support bar 18, and tool frames 20. The hitch assembly 16 is configured to couple to a hitch of a work vehicle (e.g., a tractor) to enable the work vehicle to move the agricultural seeding implement 10 along a direction of travel 22. The hitch assembly 16 is coupled to the main support bar 18, and the main support bar 18 is coupled to the tool frames 20. As illustrated, each tool frame 20 is supported by a respective wheel 24, and the main support bar 18 is supported by multiple wheels 26. In certain embodiments, each tool frame is rotatably coupled to the main support bar to enable the tool frame to follow contours of the soil surface. However, in other embodiments, each tool frame is rigidly (e.g., non-rotatably) coupled to the main support bar (e.g., such that each tool frame and a respective portion of the main support bar form a unitary structure). In the illustrated embodiment, each row unit 12 is coupled to a toolbar 28 of a respective tool frame 20 and configured to deposit agricultural product within the soil. In certain embodiments, the row units 12 are laterally offset (e.g., offset in a direction perpendicular to the direction of travel 22) from one another, such that adjacent rows of agricultural product are established within the soil. While the illustrated agricultural seeding implement frame 14 includes the main support bar 18 and the tool frames 20, in other embodiments, the frame may include other and/or additional elements to support the row units. For example, in certain embodiments, the main support bar may be omitted, a center tool frame may be coupled to the hitch assembly, and the wing tool frames may be coupled to the center tool frame. Furthermore, in certain embodiments, the tool frames may be omitted, and the row units may be directly coupled to the main support bar (e.g., toolbar), thereby forming a single row of row units.

As previously discussed, each row unit 12 of the agricultural seeding implement 10 is configured to deposit agricultural product (e.g., seed, fertilizer, etc.) into the soil. Certain row units 12 (e.g., all of the row units 12 of the agricultural seeding implement 10, a portion of the row units 12 of the agricultural seeding implement 10, at least one row unit 12 of the agricultural seeding implement 10, etc.) include an opener configured to open a trench within the soil for agricultural product deposition into the soil. For example, the opener may include a shank and a blade rigidly coupled to the shank. Each row unit 12 also includes a product tube (e.g., seed tube) configured to deposit the agricultural product into the trench formed by the opener. Accordingly, multiple rows of deposited agricultural product may be formed as the agricultural seeding implement 10 traverses a field along the direction of travel 22.

In certain embodiments, each product tube may receive the agricultural product from a pneumatic distribution system. For example, the agricultural product may be stored within a storage compartment (e.g., coupled to the frame of the agricultural seeding implement, coupled to a frame of an air cart, etc.). A metering system positioned beneath the storage compartment may control the flow of the agricultural product to the pneumatic distribution system. The pneumatic distribution system, in turn, may distribute the agricultural product to the product tubes of the row units via multiple distribution lines. For example, primary distribution lines may extend from the metering system to respective headers coupled to the frame of the agricultural seeding implement, and secondary distribution lines may extend from each header to product tubes of respective row units.

The opener/agricultural product tube of at least one row unit is followed by a closing system. The closing system includes a closing assembly having at least one closing disc configured to close the trench formed by the opener and/or to break up the side wall(s) of the trench. The closing system also includes a packer assembly that follows the closing assembly. The packer assembly includes a packer wheel configured to pack soil on top of the deposited agricultural product.

In certain embodiments, the row unit includes a link (e.g., first link) configured to pivotally couple to a toolbar of the agricultural seeding implement. The row unit also includes an opener having a shank and a blade rigidly coupled to the shank, in which the shank is pivotally coupled to the link at a pivot joint (e.g., first pivot joint). In addition, the row unit includes a closing system having a packer wheel arm pivotally coupled to the first link at the pivot joint. The closing system also includes a packer wheel rotatably coupled to the packer wheel arm. Furthermore, the closing system includes a closing disc arm pivotally coupled to the packer wheel arm, and a closing disc rotatably coupled to the closing disc arm. The closing disc arm positions a rotational axis of the closing disc rearward of the blade of the opener relative to the direction of travel, and the packer wheel arm positions a rotational axis of the packer wheel rearward of the rotational axis of the closing disc relative to the direction of travel. The closing system also includes a closing disc adjustment assembly configured to control a contact force between the closing disc and the soil surface. Because the contact force between the closing disc and the soil is controllable independently of the contact force between the packer wheel and the soil, each contact force may be adjusted for particular field conditions (e.g., soil composition, soil moisture, etc.). As a result, the closing system disclosed herein may be utilized to effectively close the trench and/or break up the side wall(s) of the trench for a variety of field conditions.

While the agricultural seeding implement 10 includes one type of row unit in the illustrated embodiment, in other embodiments, the agricultural seeding implement may include multiple types of row units and/or other suitable agricultural tools (e.g., spray nozzle(s), finishing reel(s), tillage shank(s), etc.). Furthermore, while the agricultural seeding implement 10 is configured to be towed through the field by a work vehicle in the illustrated embodiment, in certain embodiments, the agricultural seeding implement may be part of a self-propelled vehicle. For example, the frame of the agricultural seeding implement may be coupled (e.g., directly coupled, rigidly coupled, etc.) to a main frame/chassis of the self-propelled vehicle.

Figure 2:
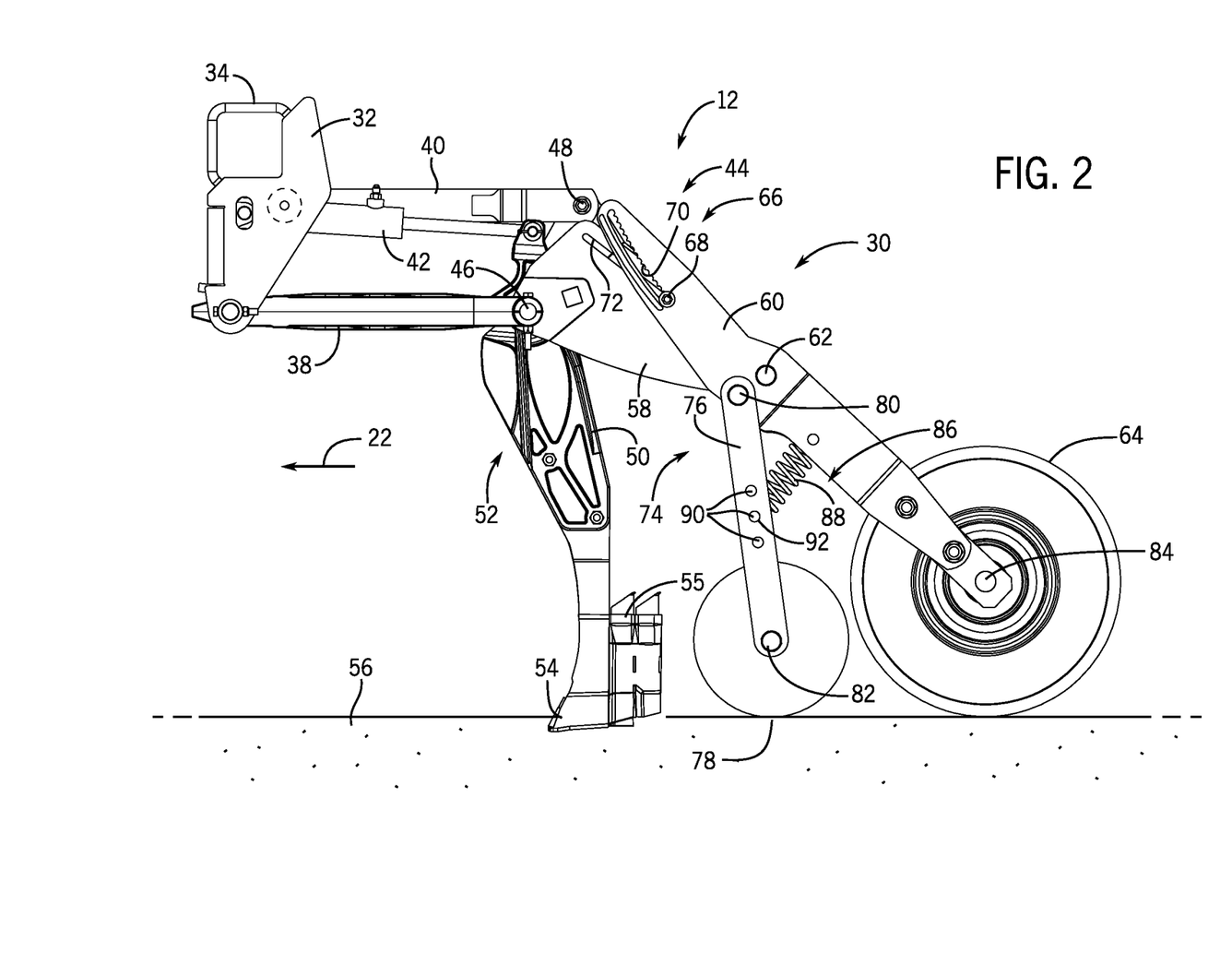
FIG. 2 is a side view of an embodiment of a row unit that may be employed within the agricultural seeding implement of FIG. 1, in which the row unit has an embodiment of a closing system.

FIG. 2 is a side view of an embodiment of a row unit 12 that may be employed within the agricultural seeding implement of FIG. 1, in which the row unit 12 has an embodiment of a closing system 30. As illustrated, the row unit 12 includes a frame support 32 and a mounting bracket 34. The frame support 32 and the mounting bracket 34 are configured to interface with a toolbar of a respective tool frame, thereby securing the row unit 12 to the agricultural seeding implement frame. While the illustrated embodiment includes a single mounting bracket 34, in other embodiments, the row unit may include additional mounting brackets (e.g., 2, 3, 4, 5, 6, or more). Furthermore, while the illustrated row unit 12 is coupled to the toolbar by the frame support 32 and the mounting bracket 34, in other embodiments, the row unit may be coupled to the toolbar by any other suitable connection system (e.g., fastener(s), a welded connection, an adhesive connection, etc.).

In addition, the row unit 12 includes a first linkage member 38, a second linkage member 40, and a biasing device, such as the illustrated cylinder 42 (e.g., hydraulic or pneumatic piston-cylinder assembly). As illustrated, the first linkage member 38 (e.g., first link) and the second linkage member 40 (e.g., second link) extend from the frame support 32 to a packer wheel arm 44 of the closing system 30. The first linkage member 38 is pivotally coupled to the frame support 32, thereby pivotally coupling the first linkage member 38 to the toolbar of the agricultural seeding implement. In addition, the first linkage member 38 is pivotally coupled to the packer wheel arm 44 at a first pivot joint 46. In the illustrated embodiment, the second linkage member 40 is pivotally coupled to the frame support 32, thereby pivotally coupling the second linkage member 40 to the toolbar of the agricultural seeding implement. Furthermore, the second linkage member 40 is pivotally coupled to the packer wheel arm 44 at a second pivot joint 48. Accordingly, the first and second linkage members form a linkage (e.g., parallel linkage) between the frame support 32 and the packer wheel arm 44. While the linkage is formed by the first and second linkage members in the illustrated embodiment, in other embodiments, the packer wheel arm may be coupled to the frame support by any other suitable type of linkage (e.g., a linkage including only the first linkage member, a linkage including only the second linkage member, etc.).

The cylinder 42 is pivotally coupled to the frame support 32 and to a shank 50 of an opener 52. In addition, the shank 50 is pivotally coupled to the first linkage member 38 and to the packer wheel arm 44 at the first pivot joint 46. A blade 54 of the opener 52 is rigidly coupled (e.g., non-movably coupled, non-rotatably coupled, non-translatably coupled, etc.) to the shank 50 and configured to engage the soil 56. Applying pressurized fluid (e.g., hydraulic fluid, air, etc.) to the cylinder 42 urges the packer wheel arm 44 and the opener 52 to translate downwardly. Translational movement of the packer wheel arm 44 and the opener 52 is controlled by the linkage. For example, the linkage may cause the packer wheel arm 44 and the opener 52 to translate along a vertical axis. While the illustrated embodiment utilizes a cylinder 42 as the biasing member, in alternative embodiments, the row unit may include another suitable type of biasing member, such as a spring or a pneumatic strut, for example.

The blade 54 is configured to form a trench within the soil 56 as the row unit 12 moves along the direction of travel 22. In the illustrated embodiment, the row unit 12 includes an agricultural product tube 55 (e.g., seed tube) configured to direct agricultural product into the trench formed by the blade 54. In the illustrated embodiment, the row unit 12 includes two agricultural product tubes 55 configured to deposit two agricultural products (e.g., two different agricultural products) into the soil. However, in other embodiments, the row unit may include more or fewer agricultural product tubes (e.g., 1, 2, 3, 4, or more).

In the illustrated embodiment, the packer wheel arm 44 includes a first portion 58 and a second portion 60 pivotally coupled to one another at a third pivot joint 62. The first portion 58 is pivotally coupled to the first linkage member 38 and to the second linkage member 40, and a packer wheel 64 of the closing system 30 is rotatably coupled to the second portion 60 of the packer wheel arm 44. The packer wheel 64 rotates along the soil surface to both pack the soil on top of deposited agricultural product and to control the penetration depth of the blade 54. In the illustrated embodiment, the row unit 12 includes a packer wheel adjustment assembly 66 configured to control the penetration depth of the blade 54 into the soil 56. The packer wheel adjustment assembly 66 includes a fastener 68 disposed within a slot 70 in the second portion 60 of the packer wheel arm 44 and a corresponding slot 72 within the first portion 58 of the packer wheel arm 44. While in a locked configuration, the fastener 68 blocks rotation of the second portion 60 of the packer wheel arm 44 with respect to the first portion 58 of the packer wheel arm 44. Conversely, while in an unlocked configuration, the fastener 68 may be translated within the respective slots to adjust the rotation of the second portion 60 of the packer wheel arm 44 about the third pivot joint 62 relative to the first portion 58 of the packer wheel arm 44. Adjusting the rotation of the second portion 60 relative to the first portion 58 controls the vertical position of the packer wheel 64 relative to the blade 54 of the opener 52, thereby controlling the penetration depth of the blade 54. Once a target orientation of the second portion relative to the first portion is established (e.g., corresponding to a target penetration depth), the fastener may be transitioned to the locked configuration, thereby blocking rotation of the second portion 60 of the packer wheel arm 44 relative to the first portion 58. Furthermore, the contact force between the packer wheel 64 and the soil 56 (e.g., the soil surface) and the contact force between the blade 54 and the soil 56 may be controlled by controlling the fluid pressure within the cylinder 42 (e.g., via a valve assembly).

While the illustrated packer wheel adjustment assembly includes a fastener disposed within slots in the packer wheel arm, in further embodiments, other suitable types of packer wheel adjustment assemblies may be utilized. For example, in certain embodiments, the packer wheel adjustment assembly may include a pin configured to be disposed within respective openings in the first and second portions of the packer wheel arm. At least one of the first portion or the second portion of the packer wheel arm may include multiple openings, and the position of the packer wheel relative to the blade may be controlled by disposing the pin within a selected opening of the multiple openings. In further embodiments, the packer wheel adjustment assembly may include a cam and a stopper. The position of the second portion relative to the first portion may be controlled by rotating the cam, thereby controlling the position of the packer wheel relative to the blade. In addition, the stopper may selectively block rotation of the cam to maintain the packer wheel in a selected position. While the packer wheel adjustment assembly is positioned proximate to the linkage members in the illustrated embodiment, in other embodiments, the packer wheel adjustment assembly may be positioned proximate to the packer wheel or at another suitable location along the packer wheel arm. Furthermore, while the illustrated row unit 12 includes a packer wheel adjustment assembly, in other embodiments, the packer wheel adjustment assembly may be omitted. In such embodiments, the packer wheel arm may include a single portion.

In the illustrated embodiment, the closing system 30 of the row unit 12 includes a closing assembly 74 configured to close the trench formed by the blade 54 of the opener 52. The closing assembly 74 includes a closing disc arm 76 and a single closing disc 78 rotatably coupled to the closing disc arm 76. As illustrated, the closing disc arm 76 is pivotally coupled to the second portion 60 of the packer wheel arm 44 at a fourth pivot joint 80, and the closing disc arm 76 positions a rotational axis 82 of the closing disc 78 rearward of the blade 54 of the opener 52 relative to the direction of travel 22 of the row unit 12. In addition, the packer wheel arm 44 positions a rotational axis 84 of the packer wheel 64 rearward of the rotational axis 82 of the closing disc 78 relative to the direction of travel 22 of the row unit 12. While the closing disc arm 76 is pivotally coupled to the second portion 60 of the packer wheel arm 44 in the illustrated embodiment, in other embodiments, the closing disc arm may be pivotally coupled to the first portion of the packer wheel arm.

The closing disc 78 is configured to close the trench formed by the blade 54 and/or to break up the side wall(s) of the trench, thereby enhancing the development of crops from the deposited seeds. In the illustrated embodiment, the closing disc 78 is substantially smooth. However, in other embodiments, the closing disc may be wavy and/or have multiple spikes extending radially outward from a central hub of the closing disc. Furthermore, in the illustrated embodiment, the closing assembly 74 has a single closing disc 78. However, in other embodiments, the closing assembly may have addition closing discs (e.g., 2, 3, 4, or more), such as multiple closing discs rotatably coupled to the closing disc arm. By way of example, one closing disc may be coupled to the packer wheel arm by a first closing disc arm, and a second closing disc (e.g., positioned rearward of the first closing disc) may be coupled to the packer wheel arm by a second closing disc arm. Each closing disc disclosed herein may be formed from a suitable material. For example, the closing disc may be formed from a rigid material, such as metal (e.g., steel, etc.), or the closing disc may be formed from a resilient material, such as rubber or polyurethane.

The closing assembly 74 includes a closing disc adjustment assembly 86 coupled to and extending between the packer wheel arm 44 (e.g., the second portion 60 of the packer wheel arm 44, the first portion 58 of the packer wheel arm 44, etc.) and the closing disc arm 76. The closing disc adjustment assembly 86 is configured to control a contact force between the closing disc and the soil. In the illustrated embodiment, the closing disc adjustment assembly 86 includes a closing disc biasing element 88 coupled to and extending between the packer wheel arm 44 (e.g., the second portion 60 of the packer wheel arm 44, the first portion 58 of the packer wheel arm 44, etc.) and the closing disc arm 76. The closing disc biasing element 88 is configured to urge the closing disc 78 (e.g., the rotational axis of the closing disc) toward the soil (e.g., soil surface). In the illustrated embodiment, the biasing element 88 includes a single coil spring. However, in other embodiments, the biasing element may include an alternative biasing device and/or additional biasing device(s) (e.g., leaf spring(s), pneumatic cylinder(s), hydraulic cylinder(s), resilient member(s), etc.) configured to urge the closing disc toward the soil. Furthermore, in the illustrated embodiment, the closing disc adjustment assembly 86 includes a series of openings 90 disposed along the closing disc arm 76 and a pin 92 coupled to an end of the biasing element 88. The pin 92 may be engaged with a selected opening 90 to control the torque applied by the biasing element 88 to the closing disc arm 76, thereby controlling the contact force between the closing disc and the soil. While the closing disc adjustment assembly includes a pin and openings in the closing disc arm in the illustrated embodiment, in other embodiments, the closing disc adjustment assembly may include other and/or additional elements to control the contact force between the closing disc and the soil. For example, the closing disc adjustment assembly may include a pin configured to engage a selected opening of multiple openings in the packer wheel arm (e.g., instead of or in addition to the pin 92/openings 90 in the closing disc arm 76). Furthermore, if the biasing device(s) include pneumatic cylinder(s) and/or hydraulic cylinder(s), the closing disc adjustment assembly may include a valve assembly configured to control pressurized fluid flow to the pneumatic/hydraulic cylinder(s).

The closing disc adjustment assembly 86 enables the contact force between the closing disc 78 and the soil 56 to be controlled substantially independently of the contact force between the packer wheel 64 and the soil 56 (e.g., the soil surface). For example, the contact force between the packer wheel and the soil may be adjusted to a first value by controlling the fluid pressure within the cylinder 42, and the contact force between the closing disc and the soil may be adjusted to a second value via the closing disc adjustment assembly 86. Each contact force may be adjusted for particular field conditions (e.g., soil composition, soil moisture, etc.). As a result, the closing system may be utilized to effectively close the trench and/or to break up the side wall(s) of the trench for a variety of field conditions (e.g., as compared to utilizing different closing systems for different field conditions).

Figure 3:
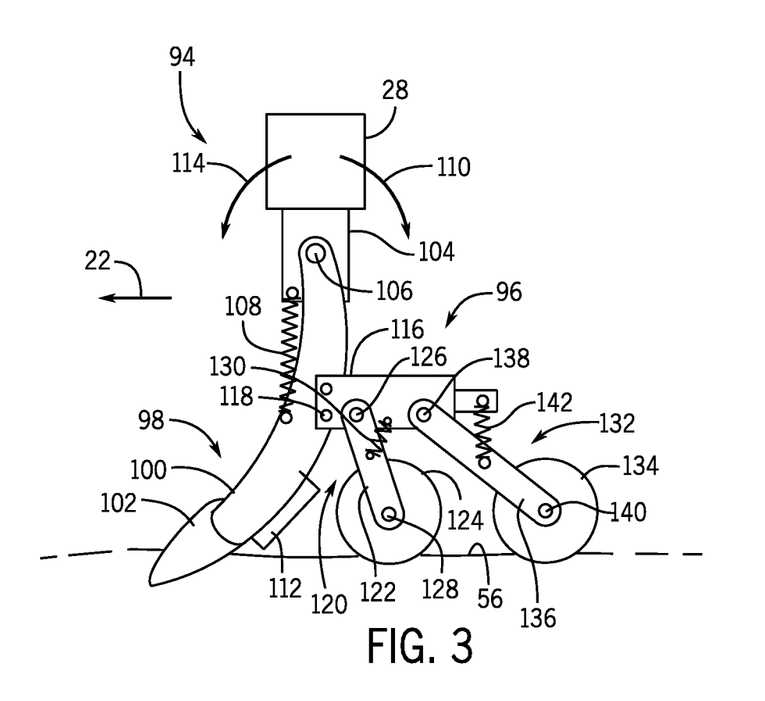
FIG. 3 is a side view of another embodiment of a row unit that may be employed within the agricultural seeding implement of FIG. 1, in which the row unit has an embodiment of a closing system.

FIG. 3 is a side view of another embodiment of a row unit 94 that may be employed within the agricultural seeding implement of FIG. 1, in which the row unit 94 has an embodiment of a closing system 96. In the illustrated embodiment, the row unit 94 includes an opener 98 having a shank 100 and a blade 102 rigidly coupled (e.g., non-movably coupled, non-rotatably coupled, non-translatably coupled, etc.) to the shank 100. The blade 102 may be rigidly coupled to the shank via any suitable connection system (e.g., fastener(s), a welded connection, press-fit connection, etc.), or the blade may be integrally formed with the shank (e.g., from a single piece of material). The shank 100 is movably (e.g., rotatably) coupled to the toolbar 28 of the agricultural seeding implement. In the illustrated embodiment, the shank 100 is pivotally coupled to the toolbar 28 via a bracket 104 and a pivot joint 106. The bracket 104 is rigidly coupled (e.g., non-movably coupled, non-rotatably coupled, non-translatably coupled, etc.) to the toolbar 28 via a suitable connection system (e.g., fastener(s), a welded connection, an adhesive connection, a press-fit connection, etc.), and the shank 100 is pivotally coupled to the bracket 104 via the pivot joint 106. While the shank is pivotally coupled to the toolbar via the bracket and the pivot joint in the illustrated embodiment, in other embodiments, the shank may be pivotally coupled to the toolbar via another suitable assembly (e.g., a linkage, multiple pivot joints, etc.). Furthermore, in certain embodiments, the shank may be translatably coupled to the toolbar via a suitable assembly (e.g., a linkage, a slide assembly, etc.), thereby enabling the shank to translate relative to the toolbar. In addition, in certain embodiments, the shank may be translatably and rotatably coupled to the toolbar via a suitable assembly, thereby enabling the shank to translate and rotate relative to the toolbar.

The row unit 94 includes a biasing member 108 configured to urge the blade 102 to engage the soil 56. In the illustrated embodiment, the biasing member includes a spring (e.g., coil spring). However, in other embodiments, the biasing member may include any other suitable device(s) (e.g., alone or in combination with the spring) to urge the blade to engage the soil. For example, the biasing member may include hydraulic cylinder(s), pneumatic cylinder(s), resilient member(s), spring(s), or a combination thereof. Furthermore, in the illustrated embodiment, the biasing member 108 extends from the bracket 104 to the shank 100 and is configured to urge the opener 98 to rotate in a first direction 110, thereby urging the blade 102 to engage the soil 56. However, in other embodiments, the biasing member may be connected to other suitable element(s), such as the blade and/or the toolbar. Furthermore, the biasing member may be positioned in front of the shank, as illustrated, or behind the shank along the direction of travel. In addition, if the opener is configured to translate relative to the toolbar, the biasing member may be configured to urge the opener to translate toward the soil and/or in the direction of travel 22 of the row unit.

In certain embodiments, the row unit may include an opener adjustment assembly configured to control the contact force between the blade and the soil. For example, the opener adjustment assembly may include a series of openings disposed along the shank and a pin coupled to an end of the biasing member. The pin may be engaged with a selected opening to control the torque applied by the biasing element to the shank, thereby controlling the contact force between the blade and the soil. In other embodiments, the opener adjustment assembly may include other and/or additional elements to control the contact force between the blade and the soil. For example, if the biasing member includes pneumatic cylinder(s) and/or hydraulic cylinder(s), the opener adjustment assembly may include a valve assembly configured to control pressurized fluid flow to the pneumatic/hydraulic cylinder(s).

The blade 102 is configured to form a trench within the soil 56, and a product tube 112 (e.g., seed tube) positioned behind the blade is configured to deposit agricultural product (e.g., seed, fertilizer, etc.) into the trench formed by the blade 102. In the illustrated embodiment, the product tube 112 is coupled to the shank 100 of the opener 98. However, in other embodiments, the product tube may be coupled to another suitable structure of the row unit (e.g., a frame of the closing system, etc.). The penetration depth of the blade into the soil may be controlled by adjusting the position of the toolbar relative to the surface of the soil. For example, the toolbars of the agricultural seeding implement may be supported by multiple wheels, and the positions of the wheels relative to the toolbars may be adjusted to control the positions of the toolbars relative to the soil surface, thereby controlling the penetration depth of the respective blades into the soil. In the illustrated embodiment, the opener 98 is configured to deflect in response to contact with an obstacle (e.g., within the soil, on the soil surface, etc.). As the row unit 94 moves in the direction of travel 22, contact between the blade 102 and an obstacle may drive the opener 98 to rotate in a second direction 114 about the pivot joint 106 against the force/torque of the biasing member 108, thereby causing the blade 102 to disengage the soil 56. After the opener 98 has cleared the obstacle (e.g., the row unit has moved past the obstacle), the force/torque provided by the biasing member 108 drives the opener to rotate in the first direction 110, thereby driving the blade 102 to re-engage the soil 56.

In the illustrated embodiment, the closing system 96 includes a frame 116 coupled to the shank 100 of the opener 98. In the illustrated embodiment, the frame 116 is rigidly coupled (e.g., non-movably coupled, non-rotatably coupled, non-translatably coupled, etc.) to the shank 100 via fasteners 118. However, in other embodiments, the frame may be rigidly coupled to the shank via another suitable connection system (e.g., a welded connection, an adhesive connection, a press-fit connection, etc.). Furthermore, in certain embodiments, the frame may be rigidly coupled to the blade via a suitable connection system. As discussed in detail below, the frame may be pivotally coupled to the opener in certain embodiments. In the illustrated embodiment, the frame 116 is only coupled to the toolbar 28 via the opener 98. Accordingly, the frame is not coupled to the toolbar by any structure that bypasses the opener. However, in other embodiments, the frame may be directly and rigidly coupled (e.g., non-movably coupled, non-rotatably coupled, non-translatably coupled, etc.) to the opener and movably coupled to the toolbar (e.g., by a linkage assembly, by a biasing element, etc.).

In addition, the closing system 96 includes a closing assembly 120 having a closing disc arm 122 and a closing disc 124 rotatably coupled to the closing disc arm 122. As illustrated, the closing disc arm 122 is pivotally coupled to the frame 116 at a pivot joint 126 (e.g., first pivot joint), and the closing disc arm 122 positions a rotational axis 128 of the closing disc 124 rearward of the blade 102 relative to the direction of travel 22 of the row unit 94. The closing disc 124 is configured to close the trench formed by the opener and/or to break up the side wall(s) of the trench, thereby enhancing the development of crops from the deposited seeds. In the illustrated embodiment, the closing disc 124 is substantially smooth. However, in other embodiments, the closing disc may be wavy and/or have multiple spikes extending radially outward from a central hub of the closing disc. Furthermore, in the illustrated embodiment, the closing assembly 120 has a single closing disc 124. However, in other embodiments, the closing assembly may have additional closing disc(s) (e.g., 1, 2, 3, 4, or more), such as multiple closing discs rotatably coupled to the closing disc arm. By way of example, a first pair of closing discs may be coupled to the frame of the row unit by a first arm, and a second pair of closing discs (e.g., positioned rearward of the first pair of closing discs) may be coupled to the frame of the row unit by a second arm.

The closing assembly 120 of the closing system 96 includes a closing disc biasing element 130 coupled to the closing disc arm 122 and configured to urge the closing disc 124 (e.g., the rotational axis of the closing disc) toward the soil 56 (e.g., soil surface). In the illustrated embodiment, the closing disc biasing element 130 is also coupled to the frame 116. However, in other embodiments, the closing disc biasing element may be coupled to any other suitable structure of the row unit (e.g., the shank of the opener, the packer wheel arm, etc.). Furthermore, in the illustrated embodiment, the closing disc biasing element 130 includes a single coil spring. However, in other embodiments, the closing disc biasing element may include an alternative biasing device and/or additional biasing device(s) (e.g., leaf spring(s), pneumatic cylinder(s), hydraulic cylinder(s), resilient member(s), etc.) configured to urge the closing disc toward the soil. In certain embodiments, the closing assembly may include a closing disc adjustment assembly configured to control a contact force between the closing disc and the soil. For example, the closing disc adjustment assembly may include a series of openings disposed along the closing disc arm and a pin coupled to an end of the biasing element. The pin may be engaged with a selected opening to control the torque applied by the biasing element to the closing disc arm, thereby controlling the contact force between the closing disc and the soil. In other embodiments, the closing disc adjustment assembly may include other and/or additional elements to control the contact force between the closing disc and the soil. For example, if the biasing device(s) include pneumatic cylinder(s) and/or hydraulic cylinder(s), the closing disc adjustment assembly may include a valve assembly configured to control pressurized fluid flow to the pneumatic/hydraulic cylinder(s).

The closing system 96 also includes a packer assembly 132 having a packer wheel 134 and a packer wheel arm 136. The packer wheel arm 136 is pivotally coupled to the frame 116 at a pivot joint 138 (e.g., second pivot joint), and the packer wheel 134 is rotatably coupled to the packer wheel arm 136. The packer wheel 134 is configured to pack soil on top of the deposited agricultural product (e.g., to facilitate development of the resulting agricultural crops). The contact surface of the packer wheel may have any suitable shape (e.g., v-shaped, flat, etc.) and/or any suitable tread pattern (e.g., chevron treads, etc.). In the illustrated embodiment, the packer wheel arm 136 and the closing disc arm 122 are configured to rotate independently of one another relative to the frame 116. Accordingly, rotation of the packer wheel arm (e.g., in response to contact between the packer wheel and an obstruction) does not directly affect rotation of the closing disc arm, and rotation of the closing disc arm (e.g., in response to contact between the closing disc and an obstruction) does not directly affect rotation of the packer wheel arm. In addition, independent rotation of the closing disc arm and the packer wheel arm enables the contact force between the closing disc 124 and the soil to be adjusted substantially independently of the contact force between the packer wheel 134 and the soil.

In addition, the packer wheel arm 136 positions a rotational axis 140 of the packer wheel 134 rearward of the rotational axis 128 of the closing disc 124 (e.g., each closing disc) relative to the direction of travel 22 of the row unit 94. While the illustrated packer assembly includes a single packer wheel, in other embodiments, the packer assembly may include additional packer wheel(s) (e.g., distributed along the direction of travel and/or positioned side-by-side). In addition, the packer wheel (e.g., the rotational axis of the packer wheel) may be oriented at any suitable angle relative to the direction of travel and/or a vertical axis (e.g., to facilitate packing of the soil on top of the deposited agricultural product). In certain embodiments, the angle of the packer wheel (e.g., the rotational axis of the packer wheel) relative to the direction of travel and/or the vertical axis may be adjustable via a suitable adjustment mechanism. Furthermore, in the illustrated embodiment, the pivot joint 126 of the closing disc arm 122 is positioned forward of the pivot joint 138 of the packer wheel arm 136, such that the closing disc arm pivot joint is separated from the packer wheel arm pivot joint on the frame. However, in other embodiments, the closing disc arm pivot joint may be positioned rearward of the packer wheel arm pivot joint, or the packer wheel arm and the closing disc arm may utilize a common pivot joint.

The packer assembly 132 of the closing system 96 includes a packer wheel biasing element 142 coupled to the packer wheel arm 136 and configured to urge the packer wheel 134 toward the soil 56 (e.g., against the soil surface). In the illustrated embodiment, the packer wheel biasing element 142 is also coupled to the frame 116 (e.g., via a bracket). However, in other embodiments, the packer wheel biasing element may be coupled to any other suitable structure of the row unit (e.g., the shank of the opener, etc.). Furthermore, in the illustrated embodiment, the packer wheel biasing element 142 includes a single coil spring. However, in other embodiments, the packer wheel biasing element may include an alternative biasing device and/or additional biasing device(s) (e.g., leaf spring(s), pneumatic cylinder(s), hydraulic cylinder(s), resilient member(s), etc.) configured to urge the packer wheel toward the soil. In certain embodiments, the packer assembly may include a packer wheel adjustment assembly configured to control a contact force between the packer wheel and the soil. For example, the packer wheel adjustment assembly may include a series of openings disposed along the packer wheel arm and a pin coupled to an end of the biasing element. The pin may be engaged with a selected opening to control the torque applied by the biasing element to the packer wheel arm, thereby controlling the contact force between the packer wheel and the soil. In other embodiments, the packer wheel adjustment assembly may include other and/or additional elements to control the contact force between the packer wheel and the soil. For example, if the biasing device(s) include pneumatic cylinder(s) and/or hydraulic cylinder(s), the packer wheel adjustment assembly may include a valve assembly configured to control pressurized fluid flow to the pneumatic/hydraulic cylinder(s).

Because the closing disc arm and the packer wheel arm are independently pivotally coupled to the frame, the contact force between the packer wheel and the soil (e.g., the soil surface) may be controlled substantially independently of the contact force between the closing disc and the soil. For example, the contact force between the closing disc and the soil may be adjusted to a first value (e.g., via the closing disc adjustment assembly, via selection of a closing disc biasing element, etc.), and the contact force between the packer wheel and the soil may be adjusted to a second value (e.g., via the packer wheel adjustment assembly, via selection of a packer wheel biasing element, etc.). Each contact force may be adjusted for particular field conditions (e.g., soil composition, soil moisture, etc.). As a result, the closing system may be utilized to effectively close the trench and/or break up the side wall(s) of the trench for a variety of field conditions (e.g., as compared to utilizing a different closing system for different field conditions).

Furthermore, because the frame 116 is rigidly coupled to the opener 98 (e.g., to the shank 100 of the opener 98), the frame 116 and the elements coupled to the frame (e.g., the packer wheel arm, the packer wheel, the closing disc arm, the closing disc, etc.) move with the opener 98 as the opener deflects in response to contact with an obstacle/obstruction. Accordingly, in response to the opener 98 engaging an obstacle/obstruction, the opener, the closing disc, and the packer wheel may disengage the soil. After the opener 98 has cleared the obstacle/obstruction, the force/torque provided by the opener biasing element 108 may drive the opener/frame to rotate in the first direction 110, thereby driving the opener, the closing disc, and the packer wheel to re-engage the soil.

In the illustrated embodiment, the row unit 94 including the closing system 96 is a seeding/seeder row unit, as compared to a planting/planter row unit. Accordingly, a storage compartment (e.g., hopper, mini-hopper, etc.) for agricultural product is not non-movably coupled to the opener 98, and a storage compartment (e.g., hopper, mini-hopper, etc.) for agricultural product is not non-movably coupled to the frame 116. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 94 includes an opener 98 having a shank 100 and a blade 102 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener and/or to the frame of the row unit, and/or a metering device (e.g., seed meter) may be non-movably coupled to the opener and/or to the frame of the row unit.

Figure 4:
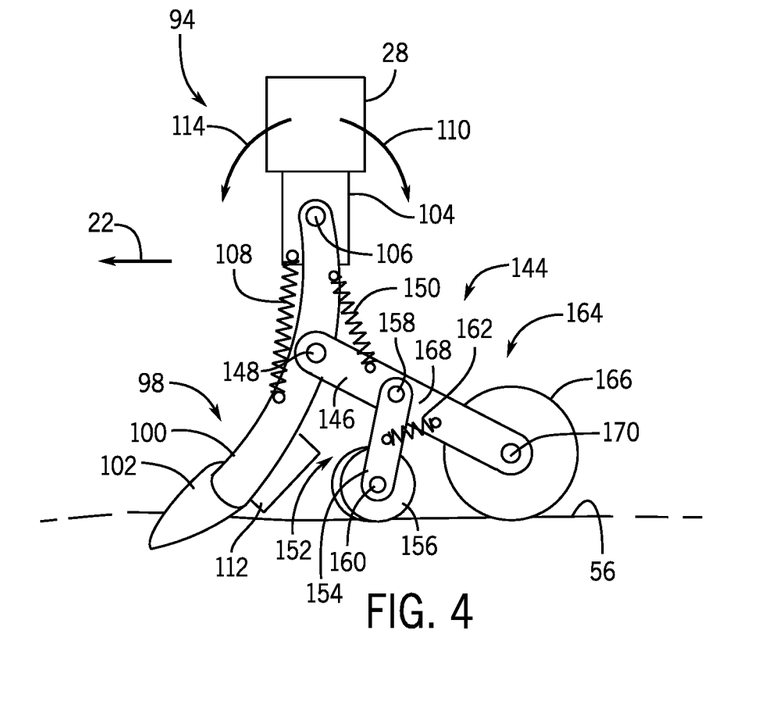
FIG. 4 is a side view of the row unit of FIG. 3, in which the row unit has another embodiment of a closing system.

FIG. 4 is a side view of the row unit 94 of FIG. 3, in which the row unit 94 has another embodiment of a closing system 144. The closing system 144 includes a frame 146 pivotally and, in certain embodiments, non-translatably coupled to the opener 98 at a pivot joint 148. In the illustrated embodiment, the frame 146 is pivotally coupled to the shank 100 of the opener 98 at the pivot joint 148. However, in other embodiments, the frame 146 may be pivotally coupled to the blade 102 of the opener 98 or another suitable portion of the opener. While the frame 146 is pivotally coupled to the opener 98 in the illustrated embodiment, in other embodiments, the frame may be rigidly coupled to the opener, as previously discussed with reference to FIG. 3. In the illustrated embodiment, the frame 146 is only coupled to the toolbar 28 via the opener 98. Accordingly, the frame is not coupled to the toolbar by any structure that bypasses the opener. However, in other embodiments, the frame may be directly pivotally and, in certain embodiments, non-translatably coupled to the opener and movably coupled to the toolbar (e.g., by a linkage assembly, by a biasing element, etc.).

In the illustrated embodiment, the closing system 144 includes a frame biasing element 150 coupled to the frame 146 and to the opener 98. The frame biasing element 150 is configured to urge the frame 146 downwardly relative to the opener 98. In the illustrated embodiment, the frame biasing element 150 includes a single coil spring. However, in other embodiments, the frame biasing element may include an alternative biasing device and/or additional biasing device(s) (e.g., leaf spring(s), pneumatic cylinder(s), hydraulic cylinder(s), resilient member(s), etc.) configured to urge the frame downwardly relative to the opener. Furthermore, while the frame biasing element 150 is coupled to the shank 100 of the opener 98 in the illustrated embodiment, in other embodiments, the frame biasing element may be coupled to the blade 102 of the opener 98 or to another suitable portion of the opener. In addition, in certain embodiments, the frame biasing element may be coupled to the toolbar (e.g., via the bracket).

In addition, the closing system 144 includes a closing assembly 152 having a closing disc arm 154 and a pair of closing discs 156 rotatably coupled to the closing disc arm 154. As illustrated, the closing disc arm 154 is pivotally coupled to the frame 146 at a pivot joint 158, and the closing disc arm 154 positions a rotational axis 160 of each closing disc 156 rearward of the blade 102 relative to the direction of travel 22 of the row unit 94. The closing discs 156 are configured to close the trench formed by the opener and/or to break up the side wall(s) of the trench, thereby enhancing the development of crops resulting from the deposited seeds. In the illustrated embodiment, the closing discs 156 are substantially smooth. However, in other embodiments, at least one closing disc may be wavy and/or have multiple spikes extending radially outward from a central hub of the closing disc. Furthermore, while the closing assembly 152 has a pair of closing discs 156 in the illustrated embodiment, in other embodiments, the closing assembly may have more or fewer closing discs (e.g., 1, 2, 3, 4, or more), such as a single closing disc rotatably coupled to the closing disc arm. By way of example, a first pair of closing discs may be coupled to the frame of the row unit by a first arm, and a second pair of closing discs (e.g., positioned rearward of the first pair of closing discs) may be coupled to the frame of the row unit by a second arm.

The closing assembly 152 of the closing system 144 includes a closing disc biasing element 162 coupled to the closing disc arm 154 and configured to urge the closing discs 156 (e.g., the rotational axes of the closing discs) toward the soil 56 (e.g., soil surface). In the illustrated embodiment, the closing disc biasing element 162 is also coupled to the frame 146. However, in other embodiments, the closing disc biasing element may be coupled to any other suitable structure of the row unit (e.g., the packer wheel arm, etc.). Furthermore, in the illustrated embodiment, the closing disc biasing element 162 includes a single coil spring. However, in other embodiments, the closing disc biasing element may include an alternative biasing device and/or additional biasing device(s) (e.g., leaf spring(s), pneumatic cylinder(s), hydraulic cylinder(s), resilient member(s), etc.) configured to urge the closing discs toward the soil. In certain embodiments, the closing assembly may include a closing disc adjustment assembly configured to control a contact force between the closing discs and the soil. For example, the closing disc adjustment assembly may include a series of openings disposed along the closing disc arm and a pin coupled to an end of the biasing element. The pin may be engaged with a selected opening to control the torque applied by the biasing element to the closing disc arm, thereby controlling the contact force between the closing discs and the soil. In other embodiments, the closing disc adjustment assembly may include other and/or additional elements to control the contact force between the closing discs and the soil. For example, if the biasing device(s) include pneumatic cylinder(s) and/or hydraulic cylinder(s), the closing disc adjustment assembly may include a valve assembly configured to control pressurized fluid flow to the pneumatic/hydraulic cylinder(s).

The closing system 144 also includes a packer assembly 164 having a packer wheel 166 and a packer wheel arm 168. In the illustrated embodiment, the packer wheel arm 168 is rigidly coupled (e.g., non-movably coupled, non-rotatably coupled, non-translatably coupled, etc.) to the frame 146, and the packer wheel 166 is rotatably coupled to the packer wheel arm 168. Because the packer wheel arm 168 is rigidly coupled to the frame 146, the frame biasing element 150 urges the packer wheel 166 toward the soil 56 (e.g., against the soil surface). The packer wheel arm 168 may be rigidly coupled to the frame 146 by any suitable connection system (e.g., fastener(s), a welded connection, an adhesive connection, a press-fit connection, etc.). Furthermore, in certain embodiments, the packer wheel arm 168 and the frame 146 may be integrally formed (e.g., from a single piece of material). In addition, because the packer wheel arm is rigidly coupled to the frame, the frame biasing element may be coupled to the packer wheel arm (e.g., instead of the frame), and/or the closing disc arm may be pivotally coupled to the packer wheel arm (e.g., instead of the frame). While the packer wheel arm is rigidly coupled to the frame in the illustrated embodiment, in other embodiments, the packer wheel arm may be pivotally coupled to the frame, and a biasing element coupled to the packer wheel arm may urge the packer wheel toward the soil surface (e.g., as discussed above with reference to FIG. 3). The packer wheel 166 is configured to pack soil on top of the deposited agricultural product (e.g., to facilitate development of the resulting agricultural crops). The contact surface of the packer wheel may have any suitable shape (e.g., v-shaped, flat, etc.) and/or any suitable tread pattern (e.g., chevron treads, etc.).

In addition, the packer wheel arm 168 positions a rotational axis 170 of the packer wheel 166 rearward of the rotational axis 160 of each closing disc 156 relative to the direction of travel 22 of the row unit 94. While the illustrated packer assembly includes a single packer wheel, in other embodiments, the packer assembly may include additional packer wheel(s) (e.g., distributed along the direction of travel and/or positioned side-by-side). In addition, the packer wheel (e.g., the rotational axis of the packer wheel) may be oriented at any suitable angle relative to the direction of travel and/or a vertical axis (e.g., to facilitate packing of the soil on top of the deposited agricultural product). In certain embodiments, the angle of the packer wheel (e.g., the rotational axis of the packer wheel) relative to the direction of travel and/or the vertical axis may be adjustable via a suitable adjustment mechanism.

In certain embodiments, the closing system may include a frame adjustment assembly configured to control contact force between the packer wheel and the soil. For example, the frame adjustment assembly may include a series of openings disposed along the frame and a pin coupled to an end of the frame biasing element. The pin may be engaged with a selected opening to control the torque applied by the frame biasing element to the frame/packer wheel arm, thereby controlling the contact force between the packer wheel and the soil. In other embodiments, the frame adjustment assembly may include other and/or additional elements to control the contact force between the packer wheel and the soil. For example, if the biasing device(s) include pneumatic cylinder(s) and/or hydraulic cylinder(s), the frame adjustment assembly may include a valve assembly configured to control pressurized fluid flow to the pneumatic/hydraulic cylinder(s).

Because the closing disc arm is pivotally coupled to the frame, the contact force between the closing discs and the soil may be controlled substantially independently of the contact force between the packer wheel and the soil (e.g., the soil surface). For example, the contact force between the packer wheel and the soil may be adjusted to a first value (e.g., via the frame adjustment assembly, via selection of a frame biasing element, etc.), and the contact force between the closing discs and the soil may be adjusted to a second value (e.g., via the closing disc adjustment assembly, via selection of a closing disc biasing element, etc.). Each contact force may be adjusted for particular field conditions (e.g., soil composition, soil moisture, etc.). As a result, the closing system may be utilized to effectively close the trench and/or to break up the side wall(s) of the trench for a variety of field conditions (e.g., as compared to utilizing a different closing system for different field conditions).

Furthermore, in certain embodiments, the closing system may include a stop coupled to the opener (e.g., to the shank of the opener) and configured to block downward rotation of the frame beyond a threshold position. In such embodiments, due to contact between the frame and the stop, the frame and the elements coupled to the frame (e.g., the packer wheel arm, the packer wheel, the closing disc arm, the closing disc, etc.) may move with the opener as the opener deflects in response to contact with an obstacle/obstruction. Accordingly, in response to the opener engaging an obstacle/obstruction, the opener, the closing disc, and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame biasing element may drive the closing disc and the packer wheel to re-engage the soil.

In the illustrated embodiment, the row unit 94 including the closing system 144 is a seeding/seeder row unit, as compared to a planting/planter row unit. Accordingly, a storage compartment (e.g., hopper, mini-hopper, etc.) for agricultural product is not non-movably coupled to the opener 98, and a storage compartment (e.g., hopper, mini-hopper, etc.) for agricultural product is not non-movably coupled to the frame 146. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 94 includes an opener 98 having a shank 100 and a blade 102 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

Figure 5:
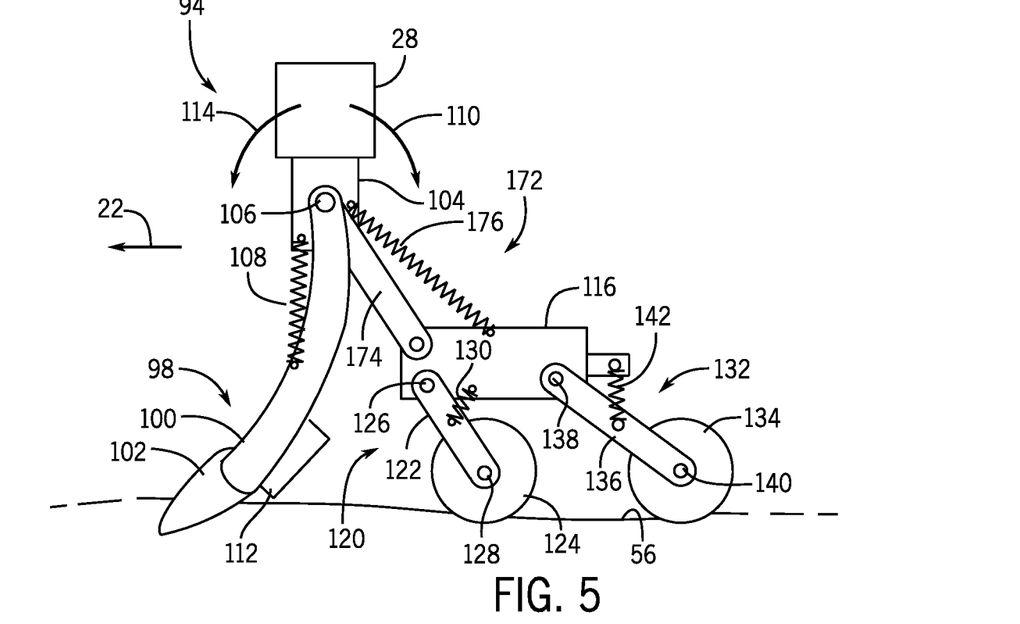
FIG. 5 is a side view of the row unit of FIG. 3, in which the row unit has a further embodiment of a closing system.

FIG. 5 is a side view of the row unit 94 of FIG. 3, in which the row unit 94 has a further embodiment of a closing system 172. The closing system 172 includes a closing system arm 174 movably (e.g., rotatably) coupled to the toolbar 28 of the agricultural seeding implement. In the illustrated embodiment, the closing system arm 174 is pivotally coupled to the toolbar 28 via the bracket 104 and the pivot joint 106. As previously discussed, the bracket 104 is rigidly coupled (e.g., non-movably coupled, non-rotatably coupled, non-translatably coupled, etc.) to the toolbar 28, and the closing system arm 174 is pivotally coupled to the bracket 104 via the pivot joint 106. In the illustrated embodiment, the closing system arm 174 is pivotally coupled to the bracket 104 by the same pivot joint 106 as the shank 100 of the opener 98. However, as discussed in detail below, the closing system arm may be pivotally coupled to the bracket by another pivot joint (e.g., remote from the opener pivot joint). Furthermore, while the closing system arm is pivotally coupled to the toolbar via the bracket and the pivot joint in the illustrated embodiment, in other embodiments, the closing system arm may be pivotally coupled to the toolbar via another suitable assembly (e.g., a linkage, multiple pivot joints, etc.). In addition, in certain embodiments, the closing system arm may be translatably coupled to the toolbar via a suitable assembly (e.g., a linkage, a slide assembly, etc.), thereby enabling the closing system arm to translate relative to the toolbar. In addition, the closing system arm may be translatably and rotatably coupled to the toolbar via a suitable assembly, thereby enabling the closing system arm to translate and rotate relative to the toolbar.

In addition, the closing system 172 includes the frame 116, as discussed above with reference to FIG. 3, and the closing system arm 174 is rigidly coupled (e.g., non-movably coupled, non-rotatably coupled, non-translatably coupled, etc.) to the frame 116. In the illustrated embodiment, the closing system 172 includes a frame biasing element 176 coupled to the frame 116 and to the bracket 104. The frame biasing element 176 is configured to urge the frame 116 downwardly relative to the toolbar 28. In the illustrated embodiment, the frame biasing element 176 includes a single coil spring. However, in other embodiments, the frame biasing element may include an alternative biasing device and/or additional biasing device(s) (e.g., leaf spring(s), pneumatic cylinder(s), hydraulic cylinder(s), resilient member(s), etc.) configured to urge the frame downwardly relative to the toolbar. Furthermore, while the frame biasing element 176 is coupled to the bracket 104 in the illustrated embodiment, in other embodiments, the frame biasing element may be coupled to the toolbar or to another suitable element rigidly coupled to the toolbar.

In certain embodiments, the closing system may include a frame adjustment assembly configured to control the downward force applied to the frame. For example, the frame adjustment assembly may include a series of openings disposed along the frame and a pin coupled to an end of the frame biasing element. The pin may be engaged with a selected opening to control the downward force applied by the frame biasing element to the frame. In other embodiments, the frame adjustment assembly may include other and/or additional elements to control the downward force. For example, if the biasing device(s) include pneumatic cylinder(s) and/or hydraulic cylinder(s), the frame adjustment assembly may include a valve assembly configured to control pressurized fluid flow to the pneumatic/hydraulic cylinder(s).

In the illustrated embodiment, the closing system 172 includes the closing disc arm 122 pivotally coupled to the frame 116 and closing disc(s) 124 rotatably coupled to the closing disc arm 122. The closing disc arm 122 positions the rotational axis 128 of each closing disc 124 rearward of the blade 102 of the opener 98 relative to the direction of travel 22 of the row unit 94. In addition, the closing system 172 includes the packer wheel arm 136 pivotally coupled to the frame 116 and the packer wheel 134 rotatably coupled to the packer wheel arm. The packer wheel arm 136 positions the rotational axis 140 of the packer wheel 134 rearward of the rotational axis 128 of each closing disc 124 relative to the direction of travel 22 of the row unit 94. Furthermore, the closing system 172 includes the packer wheel biasing element 142 coupled to the packer wheel arm 136 and configured to urge the packer wheel 134 toward the soil, and the closing system 172 includes the closing disc biasing element 130 coupled to the closing disc arm 122 and configured to urge each closing disc 124 toward the soil.

Each of the functions and/or structures of the frame 116, the closing assembly 120, the closing disc arm 122, the closing disc(s) 124, the closing disc biasing element 130, the packer assembly 132, the packer wheel 134, the packer wheel arm 136, and the packer wheel biasing element 142 disclosed above with reference to FIG. 3 may apply to the respective elements of the illustrated embodiment. Furthermore, any of the variations of the frame 116, the closing assembly 120, the closing disc arm 122, the closing disc(s) 124, the closing disc biasing element 130, the packer assembly 132, the packer wheel 134, the packer wheel arm 136, and the packer wheel biasing element 142 disclosed above with reference to FIG. 3 may apply to the respective elements of the illustrated embodiment. In addition, the closing system 172 may include the closing disc adjustment assembly and/or the packer wheel adjustment assembly disclosed above with reference to FIG. 3.

In certain embodiments, a linkage assembly may extend between the opener (e.g., the shank of the opener) and the frame/closing system arm. The linkage assembly may enable the opener to freely rotate through a range of motion in response to engagement of the opener (e.g., the blade of the opener) with an obstacle/obstruction. In addition, if the opener rotates beyond the range of motion in response to engagement with the obstacle/obstruction, the linkage assembly may drive the frame to rotate about the pivot joint. Accordingly, in response to the opener engaging certain obstacles/obstructions, the opener, the closing disc(s), and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame biasing element may drive the closing disc(s) and the packer wheel to re-engage the soil. By way of example, the linkage assembly may include a bar having a slot, in which the bar is coupled to the frame. In addition, the linkage assembly may include a pin coupled to the opener and disposed within the slot. The length of the slot may be selected to enable the opener to freely rotate through the range of motion before driving the frame to move.

In the illustrated embodiment, the row unit 94 including the closing system 172 is a seeding/seeder row unit, as compared to a planting/planter row unit. Accordingly, a storage compartment (e.g., hopper, mini-hopper, etc.) for agricultural product is not non-movably coupled to the opener 98, and a storage compartment (e.g., hopper, mini-hopper, etc.) for agricultural product is not non-movably coupled to the frame 116. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 94 includes an opener 98 having a shank 100 and a blade 102 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

Figure 6:
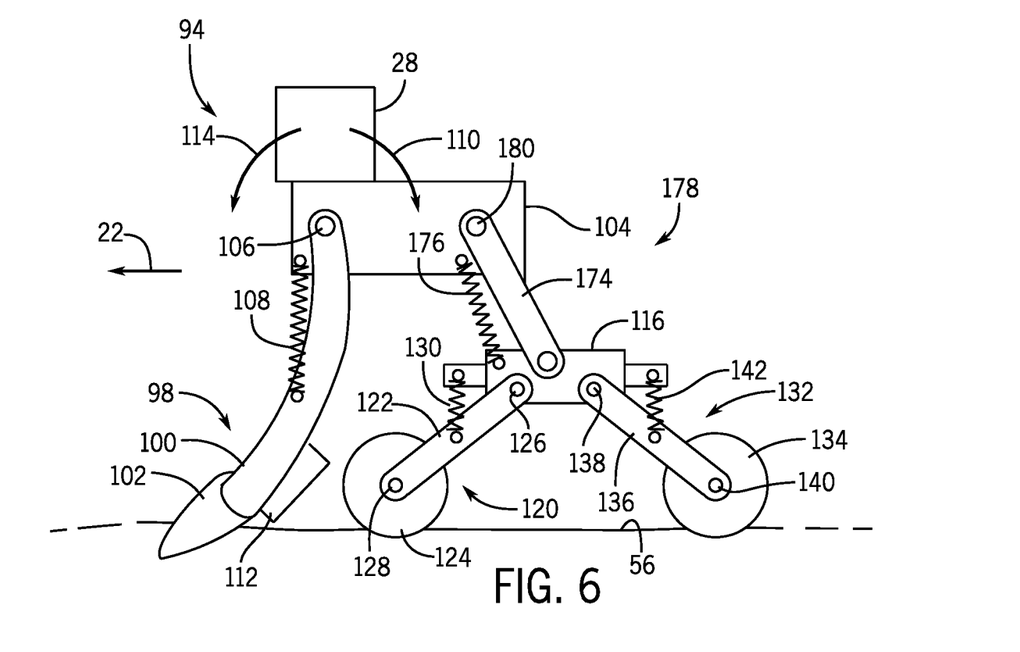
FIG. 6 is a side view of the row unit of FIG. 3, in which the row unit has another embodiment of a closing system.

FIG. 6 is a side view of the row unit 94 of FIG. 3, in which the row unit 94 has another embodiment of a closing system 178. In the illustrated embodiment, the closing system 178 includes the closing system arm 174 movably (e.g., rotatably) coupled to the toolbar 28 of the agricultural seeding implement. In the illustrated embodiment, the closing system arm 174 is pivotally coupled to the toolbar 28 via the bracket 104 and a second pivot joint 180. As previously discussed, the bracket 104 is rigidly coupled (e.g., non-movably coupled, non-rotatably coupled, non-translatably coupled, etc.) to the toolbar 28, and the closing system arm 174 is pivotally coupled to the bracket 104 via the second pivot joint 180. In the illustrated embodiment, the second pivot joint 180 is positioned remote from the opener/shank pivot joint 106. However, as previously discussed, the closing system arm and the shank may be pivotally coupled to the bracket by the same pivot joint. Furthermore, while the closing system arm is pivotally coupled to the toolbar via the bracket and the pivot joint in the illustrated embodiment, in other embodiments, the closing system arm may be pivotally coupled to the toolbar via another suitable assembly (e.g., a linkage, multiple pivot joints, etc.). In addition, in certain embodiments, the closing system arm may be translatably coupled to the toolbar via a suitable assembly (e.g., a linkage, a slide assembly, etc.), thereby enabling the closing system arm to translate relative to the toolbar. In addition, the closing system arm may be translatably and rotatably coupled to the toolbar via a suitable assembly, thereby enabling the closing system arm to translate and rotate relative to the toolbar.

In addition, the closing system 178 includes the frame 116, as discussed above with reference to FIG. 3, and the closing system arm 174 is rigidly coupled (e.g., non-movably coupled, non-rotatably coupled, non-translatably coupled, etc.) to the frame 116. In the illustrated embodiment, the closing system 178 includes the frame biasing element 176 coupled to the frame 116 and to the bracket 104. The frame biasing element 176 is configured to urge the frame 116 downwardly relative to the toolbar 28. In the illustrated embodiment, the frame biasing element 176 includes a single coil spring. However, in other embodiments, the frame biasing element may include an alternative biasing device and/or additional biasing device(s) (e.g., leaf spring(s), pneumatic cylinder(s), hydraulic cylinder(s), resilient member(s), etc.) configured to urge the frame downwardly relative to the toolbar. Furthermore, while the frame biasing element 176 is coupled to the bracket 104 in the illustrated embodiment, in other embodiments, the frame biasing element may be coupled to the toolbar or to another suitable element rigidly coupled to the toolbar.

In certain embodiments, the closing system may include a frame adjustment assembly configured to control the downward force applied to the frame. For example, the frame adjustment assembly may include a series of openings disposed along the frame and a pin coupled to an end of the frame biasing element. The pin may be engaged with a selected opening to control the downward force applied by the frame biasing element to the frame. In other embodiments, the frame adjustment assembly may include other and/or additional elements to control the downward force. For example, if the biasing device(s) include pneumatic cylinder(s) and/or hydraulic cylinder(s), the frame adjustment assembly may include a valve assembly configured to control pressurized fluid flow to the pneumatic/hydraulic cylinder(s).

In the illustrated embodiment, the closing system 178 includes the closing disc arm 122 pivotally coupled to the frame 116 and closing disc(s) 124 rotatably coupled to the closing disc arm 122. The closing disc arm 122 positions the rotational axis 128 of each closing disc 124 rearward of the blade 102 of the opener 98 relative to the direction of travel 22 of the row unit 94. In addition, the closing system 178 includes the packer wheel arm 136 pivotally coupled to the frame 116 and the packer wheel 134 rotatably coupled to the packer wheel arm. The packer wheel arm 136 positions the rotational axis 140 of the packer wheel 134 rearward of the rotational axis 128 of each closing disc 124 relative to the direction of travel 22 of the row unit 94. Furthermore, the closing system 178 includes the packer wheel biasing element 142 coupled to the packer wheel arm 136 and configured to urge the packer wheel 134 toward the soil, and the closing system 178 includes the closing disc biasing element 130 coupled to the closing disc arm 122 and configured to urge each closing disc 124 toward the soil.

Each of the functions and/or structures of the frame 116, the closing assembly 120, the closing disc arm 122, the closing disc(s) 124, the closing disc biasing element 130, the packer assembly 132, the packer wheel 134, the packer wheel arm 136, and the packer wheel biasing element 142 disclosed above with reference to FIG. 3 may apply to the respective elements of the illustrated embodiment. Furthermore, any of the variations of the frame 116, the closing assembly 120, the closing disc arm 122, the closing disc(s) 124, the closing disc biasing element 130, the packer assembly 132, the packer wheel 134, the packer wheel arm 136, and the packer wheel biasing element 142 disclosed above with reference to FIG. 3 may apply to the respective elements of the illustrated embodiment. In addition, the closing system 178 may include the closing disc adjustment assembly and/or the packer wheel adjustment assembly disclosed above with reference to FIG. 3.

In certain embodiments, a linkage assembly may extend between the opener (e.g., the shank of the opener) and the frame/closing system arm. The linkage assembly may enable the opener to freely rotate through a range of motion in response to engagement of the opener (e.g., the blade of the opener) with an obstacle/obstruction. In addition, if the opener rotates beyond the range of motion in response to engagement with the obstacle/obstruction, the linkage assembly may drive the frame to rotate about the respective pivot joint. Accordingly, in response to the opener engaging certain obstacles/obstructions, the opener, the closing disc, and the packer wheel may disengage the soil. After the opener has cleared the obstacle/obstruction, the force/torque provided by the opener biasing element may drive the opener to rotate in the first direction, thereby driving the opener to re-engaging the soil, and the force/torque provided by the frame biasing element may drive the closing disc(s) and the packer wheel to re-engage the soil. By way of example, the linkage assembly may include a bar having a slot, in which the bar is coupled to the frame. In addition, the linkage assembly may include a pin coupled to the opener and disposed within the slot. The length of the slot may be selected to enable the opener to freely rotate through the range of motion before driving the frame to move.

In the illustrated embodiment, the row unit 94 including the closing system 178 is a seeding/seeder row unit, as compared to a planting/planter row unit. Accordingly, a storage compartment (e.g., hopper, mini-hopper, etc.) for agricultural product is not non-movably coupled to the opener 98, and a storage compartment (e.g., hopper, mini-hopper, etc.) for agricultural product is not non-movably coupled to the frame 116. That is, an agricultural product storage compartment is not non-movably coupled to the opener or the frame (e.g., as compared to a planting/planter row unit that includes an agricultural product storage compartment, such as a hopper or a mini-hopper configured to receive agricultural product from a central storage compartment, non-movably coupled to the frame of the row unit). In addition, the seeding/seeder row unit 94 includes an opener 98 having a shank 100 and a blade 102 (e.g., as compared to a planting/planter row unit that includes a pair of opener discs). Furthermore, in the illustrated embodiment, a metering device is not non-movably coupled to the opener or the frame of the row unit (e.g., as compared to a planting/planter row unit that includes a frame-mounted metering device, such as a vacuum seed meter). However, in other embodiments, an agricultural product storage compartment may be non-movably coupled to the opener or the frame of the row unit, and/or a metering device (e.g., seed meter) may be non-movably coupled to the opener or the frame of the row unit.

While the closing system includes a closing system arm 174 rigidly coupled to the frame 116 in the embodiments disclosed above with referenced to FIGS. 5-6, in other embodiments, the closing system arm may be pivotally coupled to the frame. For example, in certain embodiments, the closing system arm may be a link of a linkage assembly (e.g., having one or more other links pivotally coupled to the bracket/toolbar and the frame). The linkage assembly may control movement of the frame relative to the tool bar. In addition, the frame biasing element may urge the frame downwardly relative to the toolbar.

While the row units disclosed above with reference to FIGS. 2-6 include a single opener, in other embodiments, at least one row unit may include multiple openers (e.g., 2, 3, 4, or more). For example, with regard to the embodiment of the row unit disclosed above with reference to FIG. 2, a second opener (e.g., including a shank and a blade) may be coupled (e.g., non-translatably and pivotally coupled, non-translatably and non-pivotally coupled, translatably and pivotally coupled, or translatably and non-pivotally coupled) to the packer wheel arm. An agricultural product tube (e.g., coupled to the second opener) may be configured to deposit agricultural product within a second trench formed by the second opener and, in certain embodiments, the closing disc(s) may be configured to close the second trench/break up the side wall(s), and/or the packer wheel may be configured to pack soil on top of the deposited agricultural product. Furthermore, with regard to the embodiments of the row units disclosed above with reference to FIGS. 3-6, a second opener may be coupled (e.g., non-translatably and pivotally coupled, non-translatably and non-pivotally coupled, translatably and pivotally coupled, or translatably and non-pivotally coupled) to the tool bar (e.g., via the bracket 104). The second opener may be positioned in front of the first opener along the direction of travel. An agricultural product tube (e.g., coupled to the second opener) may be configured to deposit agricultural product within a second trench formed by the second opener and, in certain embodiments, the closing disc(s) may be configured to close the second trench/break up the side wall(s), and/or the packer wheel may be configured to pack soil on top of the deposited agricultural product.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit of a seeder comprising:
an opener comprising a shank and a blade rigidly coupled to the shank, wherein the shank is configured to be movably coupled to a toolbar of the seeder; and
a closing system, comprising:
a frame coupled to the opener, wherein the frame is only coupled to the toolbar via the opener;
a closing disc arm pivotally coupled to the frame;
at least one closing disc rotatably coupled to the closing disc arm, wherein the closing disc arm positions a rotational axis of the at least one closing disc rearward of the blade of the opener relative to a direction of travel of the row unit;
a packer wheel arm coupled to the frame; and
a packer wheel rotatably coupled to the packer wheel arm, wherein the packer wheel arm positions a rotational axis of the packer wheel rearward of the rotational axis of the at least one closing disc relative to the direction of travel of the row unit.

2. The row unit of claim 1, wherein an agricultural product storage compartment is not non-movably coupled to the opener, and an agricultural product storage compartment is not non-movably coupled to the frame.

3. The row unit of claim 1, wherein the frame is rigidly coupled to the opener.

4. The row unit of claim 1, wherein the frame is pivotally coupled to the opener, the closing system comprises a frame biasing element coupled to the frame and to the opener, and the frame biasing element is configured to urge the frame downwardly relative to the opener.

5. The row unit of claim 4, wherein the packer wheel arm is rigidly coupled to the frame.

6. The row unit of claim 1, wherein the packer wheel arm is pivotally coupled to the frame, and the packer wheel arm and the closing disc arm are configured to rotate independently of one another relative to the frame.

7. The row unit of claim 6, wherein the closing system comprises a packer wheel biasing element coupled to the packer wheel arm and configured to urge the packer wheel toward soil.

8. The row unit of claim 1, wherein the closing system comprises a closing disc biasing element coupled to the closing disc arm and configured to urge the at least one closing disc toward soil.

9. The row unit of claim 1, wherein the at least one closing disc comprises a single closing disc.

10. The row unit of claim 1, wherein the at least one closing disc comprises a pair of closing discs.

11. A row unit of a seeder comprising:
an opener comprising a shank and a blade rigidly coupled to the shank, wherein the shank is configured to be pivotally coupled to a toolbar of the seeder; and
a closing system, comprising:
a closing system arm configured to be pivotally coupled to the toolbar of the seeder;
a pivot joint configured to directly pivotally couple the shank to the toolbar and to directly pivotally couple the closing system arm to the toolbar;
a frame non-movably coupled to the closing system arm;
a closing disc arm pivotally coupled to the frame;
at least one closing disc rotatably coupled to the closing disc arm, wherein the closing disc arm positions a rotational axis of the at least one closing disc rearward of the blade of the opener relative to a direction of travel of the row unit;
a packer wheel arm pivotally coupled to the frame; and
a packer wheel rotatably coupled to the packer wheel arm, wherein the packer wheel arm positions a rotational axis of the packer wheel rearward of the rotational axis of the at least one closing disc relative to the direction of travel of the row unit.

12. The row unit of claim 11, wherein the closing system comprises a packer wheel biasing element coupled to the packer wheel arm and configured to urge the packer wheel toward soil, the closing system comprises a closing disc biasing element coupled to the closing disc arm and configured to urge the at least one closing disc toward soil, or a combination thereof.

13. The row unit of claim 11, wherein an agricultural product storage compartment is not non-movably coupled to the opener, and an agricultural product storage compartment is not non-movably coupled to the frame.

14. A row unit of a seeder comprising:
an opener comprising a shank and a blade rigidly coupled to the shank, wherein the shank is configured to be pivotally coupled to a toolbar of the seeder; and
a closing system, comprising:
a closing system arm configured to be pivotally coupled to the toolbar of the seeder;
a first pivot joint configured to directly pivotally couple the shank to the toolbar and a second pivot joint configured to directly pivotally couple the closing system arm to the toolbar, wherein the first pivot joint is positioned remote from the second pivot joint;
a frame non-movably coupled to the closing system arm;
a closing disc arm pivotally coupled to the frame;

at least one closing disc rotatably coupled to the closing disc arm, wherein the closing disc arm positions a rotational axis of the at least one closing disc rearward of the blade of the opener relative to a direction of travel of the row unit;

a packer wheel arm pivotally coupled to the frame; and a packer wheel rotatably coupled to the packer wheel arm, wherein the packer wheel arm positions a rotational axis of the packer wheel rearward of the rotational axis of the at least one closing disc relative to the direction of travel of the row unit.

15. The row unit of claim 14, wherein the closing system comprises a packer wheel biasing element coupled to the packer wheel arm and configured to urge the packer wheel toward soil, the closing system comprises a closing disc biasing element coupled to the closing disc arm and configured to urge the at least one closing disc toward soil, or a combination thereof.

16. The row unit of claim 14, wherein an agricultural product storage compartment is not non-movably coupled to the opener, and an agricultural product storage compartment is not non-movably coupled to the frame.

* * * * *